United States Patent Office 2,740,962
Patented Apr. 3, 1956

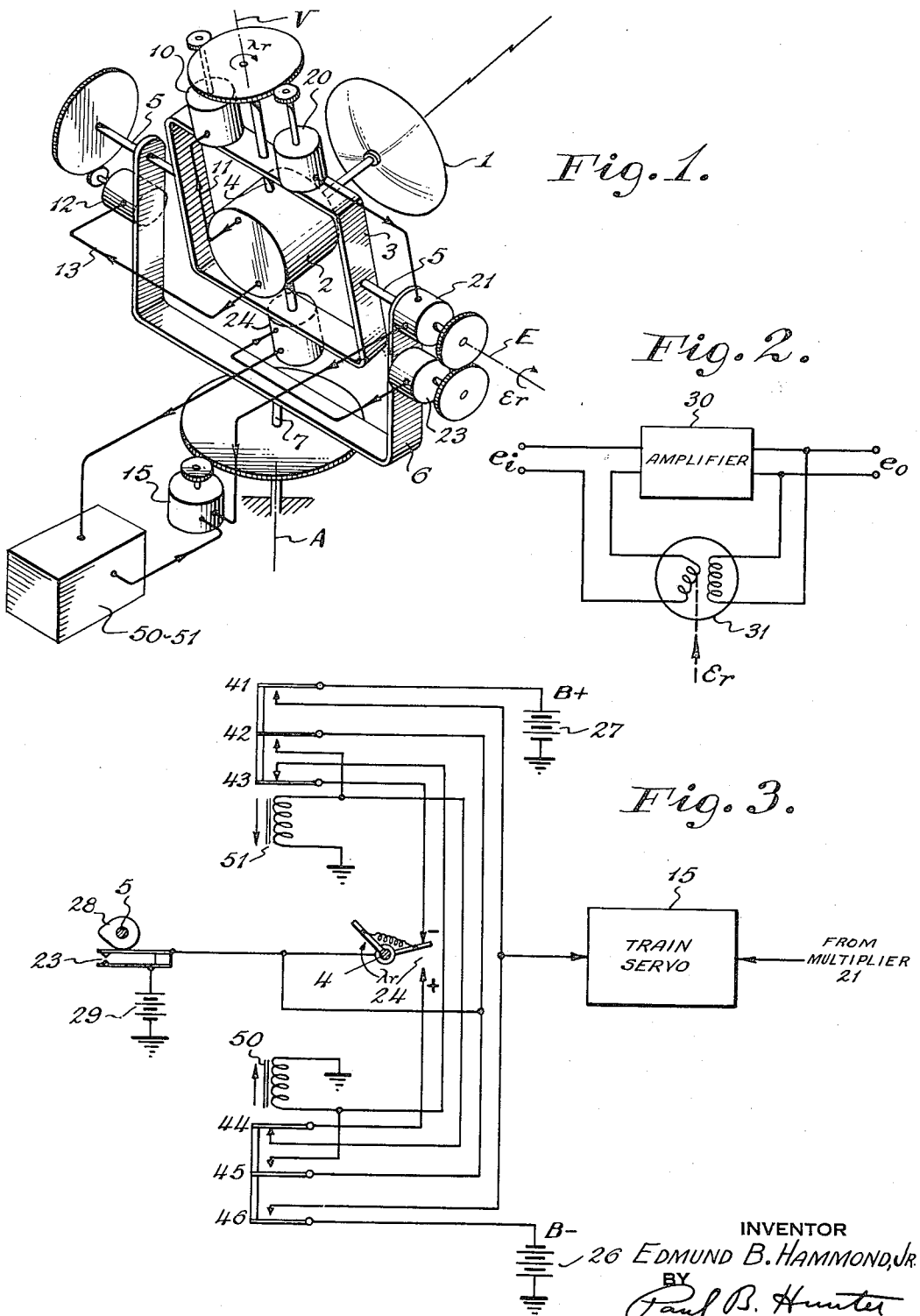

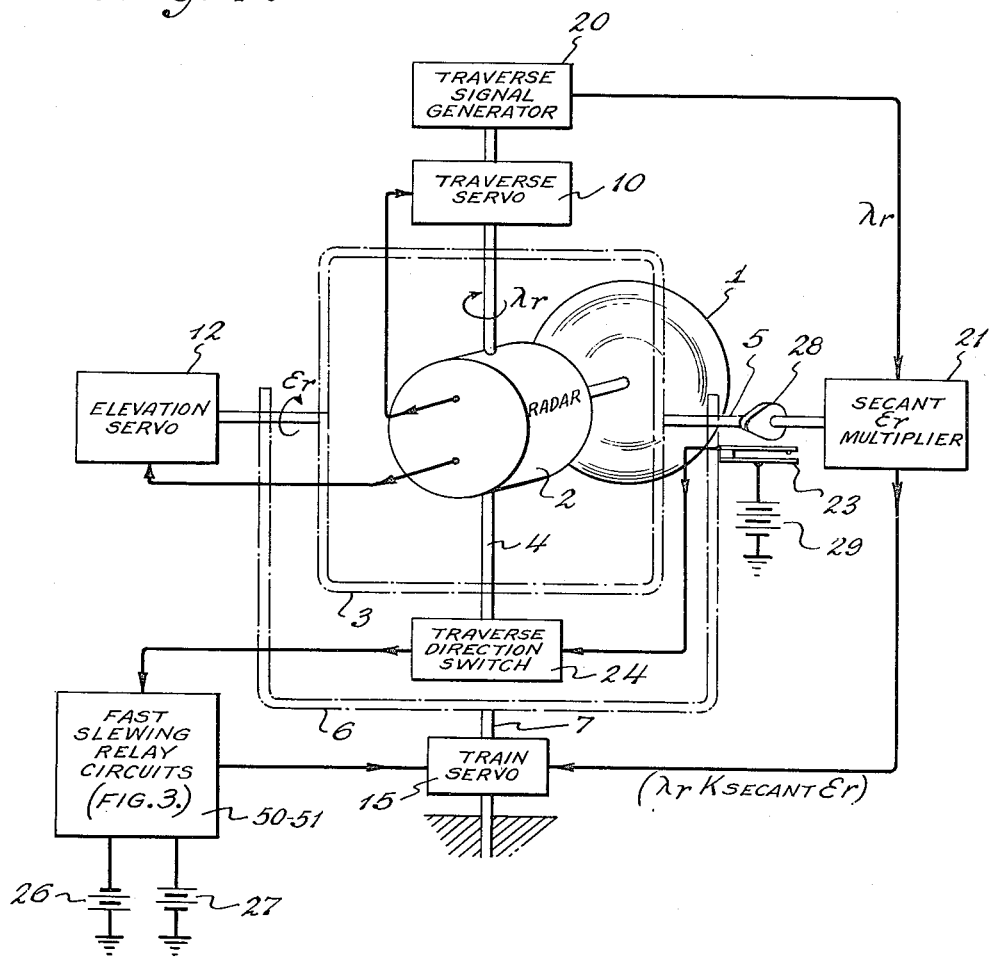

2,740,962

THREE AXIS TRACKING SYSTEM

Edmund B. Hammond, Jr., Albertson, N. Y., assignor to Sperry Rand Corporation, a corporation of Delaware Application January 5, 1950, Serial No. 136,970

16 Claims. (Cl. 343—7.4)

This invention relates to radar antenna mounting and control systems and more particularly to such systems having three axes of freedom.

It is desirable to have a radar antenna assembly with an axis system which will permit the tracking of high speed targets anywhere within a hemisphere. Up to the present time, most tracking units have been suspended in mounts which allow motion only in train and elevation. These systems are satisfactorily for tracking at low elevation angles, but as the elevation angle approaches 90 degrees, the train servo tracking rates and accelerations become excessively large, and at the 90 degree elevation point, or pole, tracking is impossible. Since it is desirable to track high speed targets throughout a hemisphere and in particular cover vertical trajectories, it is apparent that such a system must be based on a different axis arrangement from the two axis system now in use.

The three axis system of the present invention which best solves these problems utilizes conventional train and elevation axes plus an inner traverse axis on the elevation member. This traverse axis tilts with elevation angle and therefore may be kept perpendicular to the line of sight. In the present system, the elevation and traverse axes are actuated directly by the radar tracking control signals, and the train axis is constrained to follow the traverse axis. The train rate is approximately proportional to a product of the traverse member displacement from center position and a function of the elevation angle. The fundamental advantages of the system of the present invention are that the train servo need not have the high gain and frequency response required for tracking, that the tracking and stabilization servo axes are always perpendicular to the line of sight, and that the inter-axis control system is less complicated than that required for a rotating tilt-axis system.

Of course, in order to adapt the proposed axis system for use aboard a rolling and pitching ship, stabilization would have to be provided. However, stabilization is outside the scope of the present invention and will not be considered here.

A principal object of the present invention is to provide a radar antenna mounting and control system adapted to continuously follow a target passing directly overhead.

Another object of the invention is to provide a target tracking system adapted to follow a target passing through the zenith without turning over on its back.

Another object of the invention is to provide a radar antenna mounting and control system having three axes of rotation and coordinated to track fast targets at high elevation angles.

Another object of the invention is to provide a radar antenna mounting and control system adapted to track a target with reference to two axes, and adapted to be rotated about a third axis so as to maintain said first two axes approximately perpendicular to the line of sight.

Another object of the invention is to provide coarse control to a two axis target tracking system.

Another object of the invention is to provide a three axis tracking system.

Another object of the invention is to provide a high speed tracking system with a combination of high power, low accuracy and low power, high accuracy servos.

These and other objects of the invention will be apparent from the following specification and illustrations of which, Fig. 1 is an illustration of an embodiment of the invention;

Fig. 2 is a schematic diagram of the secant multiplier of Fig. 1;

Fig. 3 is a schematic diagram illustrative of the relay circuits of the embodiment of Fig. 1; and Fig. 4 is a schematic block diagram of the electrical circuits of the embodiment of Fig. 1.

Fig. 1 is directed mainly toward the mechanical arrangement, and Fig. 4 toward the electrical arrangement of Fig. 1. The invention comprises generally radar antenna 1 and associated radar 2, which are mounted for rotation about three axes of freedom, the train axis A, the elevation axis E, perpendicular to the train axis, and the cross elevation or traverse axis V.

Antenna 1 and radar 2 are supported in gimbal 3 by shaft 4 and are adapted to be rotated about traverse axis V. Gimbal 3 is adapted to be rotated about elevation axis E by shaft 5 which is rotatably mounted on gimbal yoke 6, which is in turn adapted to be rotated about train axis A by means of shaft 7.

Antenna 1 and radar 2 are adapted to be rotated about traverse axis V by means of traverse servo 10 which turns shaft 4 in response to radar tracking signals received over connection 11 from radar 2. The gimbal 3 is adapted to be rotated about elevation axis E by means of elevation servo 12 which turns shaft 5 in response to elevation tracking signals received through connection 13 from radar 2.

Thus far it may be seen that the target is tracked about two axes, the elevation axis E and the traverse axis V, in a conventional manner by means of radar error signals applied to the respective elevation and traverse servos 12 and 10. There are many two axis tracking systems in the prior art which are suitable for this portion of the present system.

However, as previously discussed, it is not feasible to track over a complete hemisphere with a two axis system, because as the target passes directly overhead or at a very high elevation angle, in order to follow the target the system must turn over on its back, so to speak, introducing an instantaneous train error of 180° at the point of 90° elevation. To avoid this problem the present invention adds a third axis of rotation.

This third degree of freedom is provided by gimbal yoke 6 which is adapted to be rotated about the train axis A by means of train servo 15 in response to an error signal which is proportional to the traverse deflection angle $\lambda_r$ and a function of the elevation angle $\epsilon_r$. The purpose of the rotation about the train axis is to keep the line of sight reasonably perpendicular to the two tracking axes, the traverse axis V and the elevation axis E. The train rotation may be thought of as a coarse tracking adjustment which provides that the traverse angle will not become too large. Therefore, a high power, low accuracy servo may be used as the train servo, whereas, the traverse servo 10 may be of a low power as the traverse angle will be kept reasonably small by the coarse adjustment afforded by the train servo. Thus it will be seen that the antenna 1 is rotatably mounted for angular movement about first, second, and third axes. The first and second or elevation axis E and train axis V are normal to each other and the second and third axes or elevation axis E and azimuth axis A are also normal to each other and are coplanar.

In providing the train drive signal it will be realized that the train servo must turn quicker as the elevation angle becomes higher. Therefore, the secant function of the elevation angle is used as an input to the train servo 5. The secant multiplier 21 which is mounted on the elevation axis E supplies a signal proportional to the secant of the elevation angle. It is also necessary to apply a component of the traverse angle $\lambda_r$ to help adjust the train servo. The $\lambda_r$ signal is taken from traverse control potentiometer 20. The product of these two signals is ($K$ secant $\epsilon_r \times \lambda_r$). This correction signal will enable the train servo to operate so that the traverse angle will not become unduly large. Secant multiplier 21 may comprise a specially wound potentiometer, or the alternate arrangement shown in Fig. 2.

However, there is still the difficulty that when a target passes directly overhead the system will lose the target because it is not able to turn over on its back. To meet this contingency, that is, when the elevation angle tends to exceed 90°, an elevation slewing switch 23 is mounted on gimbal yoke 6 and connected to shaft 5 by suitable gearing. When the elevation angle becomes 90° the elevation slewing switch 23 applies a high speed signal which is much larger than the normal slewing signal to the train servo 15, so that the system can turn rapidly around the train axis until the elevation angle becomes less than 90°. The system does not lose the target even momentarily as antenna 1 can rotate past 90° elevation angle while it is rapidly slewing around, so that even very fast targets may be continuously followed.

The shortest slewing distance to reduce the elevation angle depends on whether the traverse angle $\lambda_r$ is right or left, therefore, the high speed slewing signal is connected through elevation slewing switch 23 through traverse toggle switch 24 which polarizes the high speed signal. In other words, it tells the train servo which way to turn, i. e. whether right or left rotation will be the shortest one to reduce the target elevation angle. A detailed schematic circuit showing the connection of the elevation slewing switch 23 and the traverse toggle switch is given in Fig. 3.

The operation of the embodiment of Fig. 1 may be divided into two main functions, namely ordinary two axis tracking and coarse control by third axis rotation. The tracking function is accomplished in a conventional manner by providing error signals from the radar 2 with reference to two mutually perpendicular reference axes, the elevation axis E and the traverse axis V. In order to track accurately it is desirable to have low power, but accurate servos for the elevation servo 12 and the traverse servo 10.

The coarse control is desirable to minimize the speed and power required for these two tracking servos, and to provide it the two axis tracking system so far described is mounted for rotation without a third axis, the train axis. This rotation about the train axis is, in effect, a coarse adjustment and tends to minimize the traverse angle. It also minimizes the problem which occurs when a target flys directly overhead, or through a pole of the two axis tracking system.

The system operation may be illustrated by the following example. Assume a target is approaching the radar system location and will pass by at a cross-over range of a medium distance say ten thousand yards. The radar 2 and antenna 1 will follow the target by feeding error signals to the tracking servos, the traverse servo 10 and the elevation servo 21. At the same time the entire two axis tracking system also turns about the train axis so that the traverse angle $\lambda_r$ never becomes larger than a nominal figure say 20° in a particular design. The train error signal which actuates this movement about the train axis is composed of a traverse angle function and the secant function of the elevation angle.

In the event that the target flys close to the zenith over the radar location so that the elevation angle becomes very high, then the train error signal will become large and the train servo will move faster as its movement is proportional to the secant function of the elevation angle. In the most critical condition possible, that is when the target flys directly overhead, the elevation angle tends to increase to more than 90°. In this event as the elevation angle becomes 90° a separate high speed slewing signal is applied by switch 23 to the train servo which slews the whole system around at the highest possible speed until the target angle is reduced to less than 90°. The system is arranged to rotate the antenna about 20° past the 90° point so that there is no discontinuity in tracking the target.

Fig. 2 shows another embodiment form of secant multiplier 21. This circuit utilizes a high-gain amplifier 30 with degenerative feed-back, the feed-back signal being multiplied by the cosine of the elevation angle. In the system shown, a synchro 31 is used to obtain the cosine multiplication, consequently this arrangement could be used with an A.-C. signal only. However, if the synchro were replaced by a cosine potentiometer, a D.-C. signal could be used. The output may be represented in the following equation.

$$e_0 = \frac{1}{\frac{1}{\mu} + K' \cos \epsilon_r} e_i \cong (K \sec \epsilon_r) e_i$$

where $$K = \frac{1}{K'}$$

and $\mu$ is amplifier gain.

Figure 3 shows a wiring schematic for the elevation and transverse switches 23 and 24 which gives the desired type of operation. The high speed slewing signal from batteries 26 or 27 will be applied to the train servo when the elevation switch is closed at 90° by cam 28 on shaft 5, the slewing direction being dictated by traverse toggle switch 24 according to the algebraic sign of the traverse angle $\lambda_r$ at the time the elevation switch is closed. Switch 24 is a two condition switch, it has no neutral or "off" position. After the initial relay selection, the traverse switch 24 can have no further effect on the slewing signal. This signal will be removed when the elevation angle drops below 90°.

The relay operation is as follows: The relay coils 50 and 51 are actuated in the direction of the arrows when energized. When the elevation angle becomes 90° and with traverse toggle switch 24 in the position shown, voltage source 29 is connected through switches 23 and 24, and contact 43 to energize relay coil 50. This connects "minus" slewing source 26 to train servo 15 through contact 46. The circuit from source 29 through elevation switch 23, contact 45 and coil 50, is a holding circuit which is only broken when the elevation angle becomes less than 90°.

When traverse switch 24 is in the other position (not shown) "plus" slewing source 27 is connected to train servo 15 through contact 41 and is held by the circuit through holding contact 42.

Fig. 4 is generally similar to Fig. 1 and illustrates the electrical connections and operations of the various elements. It comprises radar antenna 1 and associated radar 2 which are mounted for rotation about three axes of freedom; the train axis, the elevation axis and the cross-elevation or traverse axis. These axes are illustrated in Fig. 1.

Antenna 1 and radar 2 are supported in gimbal 3 by shaft 4 and are adapted to be rotated about the traverse axis. Gimbal 3 is adapted to be rotated about the elevation axis by shaft 5 which is rotatably mounted on gimbal yoke 6, which is in turn adapted to be rotated about the train axis by means of shaft 7 in response to the train servo 15.

It will be seen that there are three separate servo systems, one on each axis. The elevation servo 12 is actuated by an error signal from the radar 2 in a conventional manner. The traverse servo 10 is also actuated conventionally by an error signal from the radar 2, the error signal being proportional to the traverse error angle $\lambda_r$. Both the levation and traverse radar tracking systems may be similar to that shown in copending application S. N. 593,049, for "Servomotor System" in the name of R. D. McCoy, filed May 10, 1945, now Patent 2,515,248, granted July 18, 1950.

The train axis servo 15 has a more complex input. It has two modes of operation, normal and high speed. It must be borne in mind that during normal operation, targets are tracked with the elevation and traverse servos 10 and 12 and that the train servo 15 exerts only a coarse, overall control. The normal train signal $\lambda_r$ originates in traverse signal generator 20 which may be a potentiometer connected to traverse axis shaft 4. This signal is transmitted through secant multiplier 21 which is mechanically connected to the elevation shaft 5. Therefore, the resultant signal to the train servo 15 is the traverse error signal $\lambda_r$ multiplied by the secant function of the elevation angle $\epsilon_r$.

The reason for using the secant function of the elevation angle is that, as the elevation angle $\epsilon_r$ becomes greater, a larger signal is required to drive the train servo 15 because it must move faster at high target elevation angles. The secant function approaches infinity at 90° and therefore provides an increasingly larger amplitude of signal to the train servo at high target elevation angles.

The need for this variable signal can be visualized by imagining a target aircraft gradually approaching from a distance. At a great distance the elevation angle $\epsilon_r$ will be relatively low, but as the aircraft approaches, the elevation angle will become higher and the train angle $\lambda_r$ will change more rapidly. If the aircraft passes closely overhead at a high elevation angle the train angle will change very rapidly.

The most critical situation is when the target passes directly overhead; in that case the train angle changes instantaneously 180°. This may be visualized by considering a target plane approaching on a train angle of 0°, and passing directly overhead. As the radar system tracks the approaching target the elevation angle becomes higher and higher but the train angle remains 0°. As the plane passes directly overhead the elevation angle becomes 90° and the train angle changes instantaneously from 0° to 180° and the radar system must turn over on its back, to continue to follow the target.

When the above contingency occurs, that is, when the elevation angle becomes 90°, the system switches to the high speed mode of operation and a special high speed slewing signal is connected by cam 28 and switch 23 to the train servo 15. This high speed signal slews the entire antenna system around at maximum rate by means of train servo 15 and shaft 7 until the elevation angle $\epsilon_r$ is reduced to less than 90°, so that the system is again tracking the target right side up and not on its back.

It must be emphasized that during this high speed slewing maneuver the system does not lose the target and there is no discontinuity in tracking. The target tracking system is designed so that it will follow a target at least 20° in excess of 90° elevation. It is also designed so that the emergency slewing signal will turn the system around 180° in less time that it would take a very fast target to go from 90° elevation to 110°, so that there is no possibility of losing the target during this high speed slewing operation. The fast slewing relay circuits 50 and 51 are shown in detail in Fig. 3. The cam 28 on elevation shaft 5 actuates elevation switch 23 when the elevation angle $\epsilon_r$ becomes 90°. The cam 28 is preferably cut to hold switch 23 closed up to elevation angles of at least 110°, since as previously mentioned, the system is arranged to recover from "on the back" tracking of even very fast targets, before they reach an elevation angle of 110°.

The fast slewing signal is applied through traverse direction switch 24 which gives the proper connection for the shortest slewing direction. Thus, if the target passes a bit to the left, the shortest slewing distance will be to the left and vice versa. The slewing relay circuits 50 and 51 are given in detail in Fig. 3, which also shows details of switches 23 and 24, cam 28 and the relay connections. The system slews around until the elevation angle falls below 90°, and the system will then continue tracking the target in an upright position and not on its back. When the elevation angle falls below 90°, the cam 28 opens switch 23.

The train servo 15 may be a hydraulic servo system similar to that shown in copending application Ser. No. 483,532, entitled Turret Control Servo System in the names of E. B. Hammond, W. G. Wing and F. N. Williams, filed April 17, 1943, now U. S. Patent 2,704,489, issued March 27, 1955.

Thus it is seen that the present invention permits the use of a high-power, low-performance servo on the train axis for slewing, and two high-performance relatively low-power servos on the traverse and elevation axes for tracking. The tracking signals go directly to these two servos in conventional manner and the train servo receives a signal proportional to the displacement of the traverse axis from its center position and the secant of the elevation angle. It acts to keep that axis centered, but its response time may be slow since the traverse axis might have an allowable displacement of 20 to 40 degrees or so.

The actual servos 10 and 12 to be employed for the inner two axes are conventional and may be hydraulic, or they may consist of electric motors controlled by thyratrons, Ward-Leonard sets, or amplidynes depending on the size of the mount and other design considerations. The train axis slewing servo 15 may be a Vickers type hydraulic variable speed drive or a large electric servo. It is not required to be highly accurate.

It is intended that all matter contained in the above description of the three axis mount shall be interpreted as illustrative only. The three axis system of the present invention may be used for other purposes than for radar antennae, for instance telescope mountings or even mountings for small guns.

What is claimed is:

1. A radar system adapted to scan a complete hemisphere comprising a radar antenna mount, means to rotate said antenna mount about three reference axes and means connected to control said rotating means to enable said antenna to continuously follow a target passing through the zenith including three servo means connected to rotate said antenna about said three axes and means connected thereto to resolve azimuth ambiguity as a target passes overhead.

2. A radar tracking system adapted to continuously follow a target passing through the zenith comprising a radar antenna, means to track a target by rotating said antenna about two axes, and control means to rotate said antenna about a third axis including means to prevent said radar antenna from turning higher than ninety degrees in elevation, and means connected and adapted to resolve azimuth ambiguity as a target passes overhead.

3. In a target tracking system rotatable about three axes, means adapted to track targets passing directly overhead comprising fine tracking means to track targets about two of said axes, and coarse tracking means to control rotation about said third axis including means to maintain said first two axes approximately perpendicular to the line of sight.

4. A radar system adapted to track continuously over a complete hemisphere comprising a radar antenna having three axes of freedom, coarse tracking means to roite said antenna about a first train axis, fine tracking means to rotate said antenna about a second elevation axis perpendicular to said train axis, means to rotate said antenna about a third traverse axis perpendicular to said elevation axis, and means responsive to rotation about said second and third axes to control said rotation about said first axis, to prevent the antenna from losing the target as a target passes directly overhead.

5. In a radar system adapted to track continuously over complete hemisphere, a radar antenna having three axes of freedom comprising means to rotate said antenna about a first train axis, means to rotate said antenna about a second elevation axis perpendicular to said train axis, means to rotate said antenna about a third traverse axis perpendicular to said elevation axis, and means to prevent the antenna from losing the target as a target passes closely overhead, said last means including means to rotate said antenna about said train axis proportionally to the product of said traverse angle deflection and the secant of said elevation angle deflection.

6. In a radar system adapted to track over a complete hemisphere, a radar antenna having three axes of freedom, means to rotate said antenna about a first train axis, means to rotate said antenna about a second elevation axis perpendicular to said train axis, means to rotate said antenna about a third traverse axis perpendicular to said elevation axis, fine control means to track targets by rotating said antenna about said elevation and traverse axes, and coarse control means responsive to rotations about said second and third axes to control rotation about said first axis to quickly reduce elevation angles of more than 90°.

7. A radar system adapted to track over a complete hemisphere comprising a radar antenna having three axes of freedom, means to rotate said antenna about a first train axis, means to rotate said antenna about a second elevation axis perpendicular to said train axis, means to rotate said antenna about a third traverse axis perpendicular to said elevation axis, means to track targets by rotating said antenna about said elevation and traverse axes, and means of eliminate elevations of more than 90°, said last means comprising means to control rotation about said train axis so as to keep the line of sight approximately perpendicular to said elevation and traverse axes.

8. A radar antenna having three axes of freedom including a first train axis a second elevation axis perpendicular to said train axis and a third traverse axis perpendicular to said elevation axis, radar signal tracking means to rotate said antenna about said traverse and elevation axes, and control means to rotate said antenna about the train axis proportionally to the product of the traverse deflection angle and the secant of the elevation deflection angle, and means to prevent the system from turning over 90° in elevation angle as a target passes directly overhead.

9. A radar antenna rotatable about three axes, a first train axis, a second elevation axis perpendicular to said train axis and a third traverse axis perpendicular to said elevation axis, radar signal tracking means to rotate said antenna about said traverse and elevation axes, and control means to rotate said antenna about the train axis proportionally to the product of the traverse deflection angle and the secant of the elevation deflection angle, and means to prevent the system from turning over 90° in elevation as a target passes directly overhead, said last means comprising a switch actuated at 90° elevation and arranged to provide a high speed slewing signal to said train axis control means.

10. A radar antenna rotatable about three axes, a first train axis, a second elevation axis perpendicular to said train axis and a third traverse axis perpendicular to said elevation axis, radar signal tracking means to rotate said antenna about said traverse and elevation axes, and control means to rotate said antenna about the train axis proportionally to the product of the traverse deflection angle and the secant of the elevation deflective angle, and means to prevent the system from turning over 90° in elevation as a target passes directly overhead, said last means comprising a switch actuated at 90° elevation and arranged to provide a high speed slewing signal to the said train axis control system and switching means adapted to select the shortest slewing distance to reduce the target elevation angle.

11. A target tracking system comprising an antenna mount rotatable about first and second reference axes, a first servo means connected to track said antenna mount about said first reference axis, second servo means connected to track said antenna mount about said second reference axis, tracking control signal means adapted to control said two servo means, third servo means connected to rotate said antenna mount about a third reference axis, and control means adapted to control said third servo means in response to deviations from said first and second reference axes.

12. A gimbal yoke adapted to be rotated about a vertical axis, a gimbal ring mounted on said yoke and adapted to be rotated about a horizontal axis, a radar antenna mounting mounted inside said gimbal ring and adapted to be rotated about a traverse axis perpendicular to said horizontal elevation axis, first and second fine target tracking control means connected and adapted to control the rotation of said antenna about said horizontal and said traverse axis, and third coarse target tracking control means connected and adapted to control the rotation of said antenna about said vertical axis, to track a target passing overhead without azimuth ambiguity.

13. Apparatus as in claim 12 wherein said third tracking control means includes means to generate a control signal proportional to the product of traverse axis deflection angle and the secant of elevation angle.

14. Apparatus as in claim 13 wherein said third tracking means includes a high speed high power servo motor responsive to said control signal whereby separate coarse and fine tracking control is provided.

15. In a radiant energy system adapted to track a selected source of signals including directionally sensitive reception means rotatably mounted in first, second, and third axes of freedom, said first and second axes being normal to each other and said second and third axes being normal to each other and co-planar; a servomechanism system to spatially position said reception means comprising reversible driving means for rotating said reception means about each axis in response to respective tracking error signals, the tracking error signal to said third axis driving means being the product of the tracking error signal to said first driving means and a function of the rotational disposition of said reception means about said second axis, whereby said reception means tracks a source of signals by rotation about said first axis through a relatively small determinable angle regardless of the spatial position of said source.

16. In a radiant energy system adapted to track a selected source of signals including directionally sensitive reception means rotatably mounted in first, second, and third axes of freedom, said first and second axes being normal to each other and said second and third axes being normal to each other and coplanar; a servomechanism system to spatially position said reception means comprising reversible driving means for rotating said reception means about each axis in response to respective track error signals, and means to impress a 180° rotational signal upon said third axis driving means as said first axis of freedom passes through the plane common to said second and third axes.

(References on following page)

References Cited in the file of this patent

UNITED STATES PATENTS

| | | |
|---|---|---|
| 2,412,612 | Godet | Dec. 17, 1946 |
| 2,414,108 | Knowles et al. | Jan. 14, 1947 |
| 2,415,678 | Edwards | Feb. 11, 1947 |
| 2,416,562 | Alexanderson | Feb. 25, 1947 |
| 2,417,248 | Godet | Mar. 11, 1947 |
| 2,426,658 | Wooldridge | Sept. 2, 1947 |
| 2,438,576 | Rost | Mar. 30, 1948 |
| 2,446,024 | Porter | July 27, 1948 |
| 2,459,117 | Oliver | Jan. 11, 1949 |
| 2,468,751 | Hansen | May 3, 1949 |
| 2,472,824 | Hays | June 14, 1949 |
| 2,473,175 | Ridenour | June 14, 1949 |
| 2,497,883 | Harris | Feb. 21, 1950 |
| 2,499,228 | Norden | Feb. 28, 1950 |
| 2,515,248 | McCoy | July 18, 1950 |
| 2,519,223 | Cheek | Aug. 15, 1950 |
| 2,525,496 | McCann | Oct. 10, 1950 |
| 2,551,180 | Starr et al. | May 1, 1951 |
| 2,620,441 | McCoy et al. | Dec. 2, 1952 |